Sept. 6, 1932.         D. S. FAULKNER                1,875,430
                        ROTARY MACHINE
                   Filed May 2, 1927            3 Sheets-Sheet 1
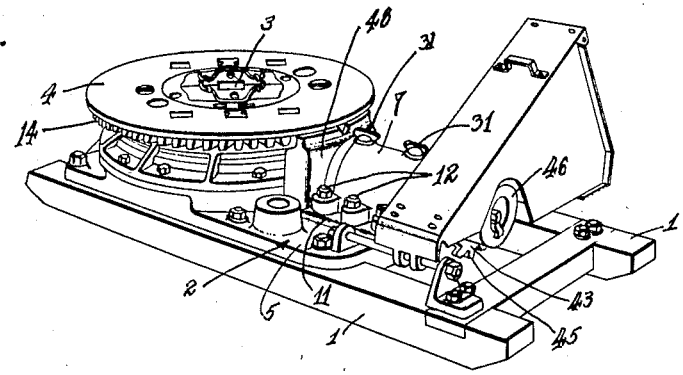
Inventor
David S. Faulkner
By Lyon & Lyon
Attorneys Sept. 6, 1932.  D. S. FAULKNER  1,875,430
ROTARY MACHINE
Filed May 2, 1927  3 Sheets-Sheet 2

Inventor
David S. Faulkner
By Lyon & Lyon
Attorneys

Sept. 6, 1932.   D. S. FAULKNER   1,875,430
ROTARY MACHINE
Filed May 2, 1927   3 Sheets-Sheet 3
Fig. 5.
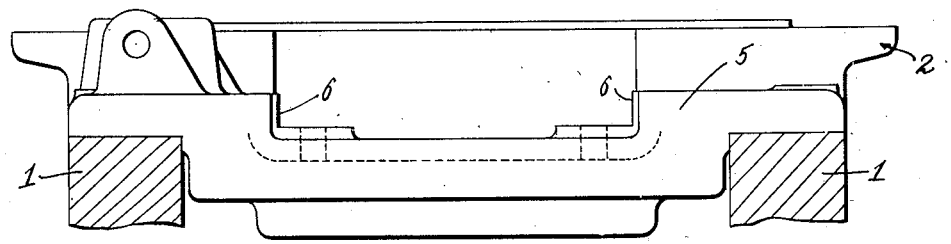
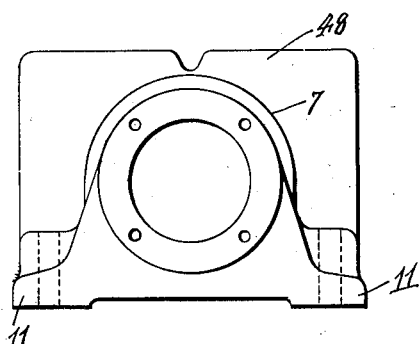
Fig. 6.
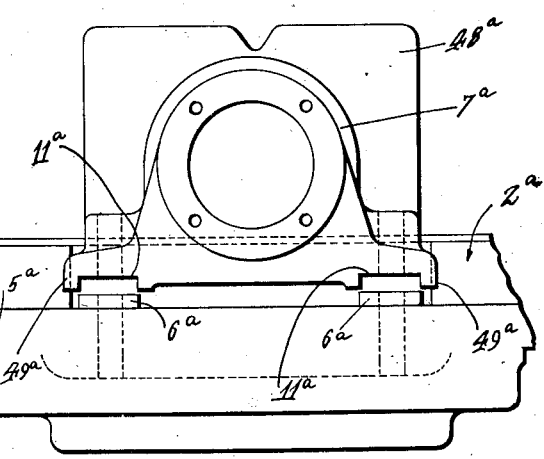
Fig. 7.
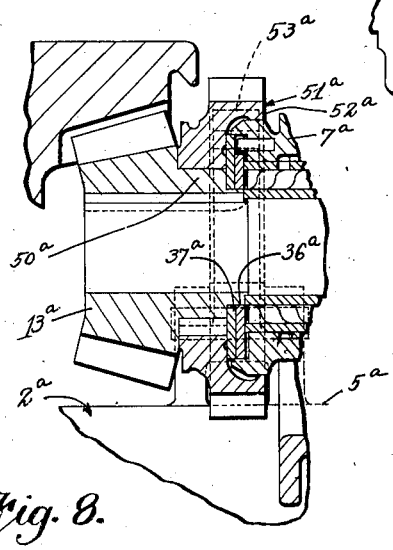
Fig. 8.
Inventor
David S. Faulkner
By Lyon & Lyon
Attorneys Patented Sept. 6, 1932

1,875,430

UNITED STATES PATENT OFFICE

DAVID S. FAULKNER, OF LOS ANGELES, CALIFORNIA, ASSIGNOR, BY DIRECT AND MESNE ASSIGNMENTS, OF ONE-HALF TO THE NATIONAL SUPPLY COMPANY, OF TOLEDO, OHIO, A CORPORATION OF OHIO, AND ONE-HALF TO EMSCO DERRICK AND EQUIPMENT COMPANY, OF LOS ANGELES, CALIFORNIA, A CORPORATION OF CALIFORNIA

ROTARY MACHINE

Application filed May 2, 1927. Serial No. 188,306.

This invention relates to rotary machines, and is more particularly directed to a rotary machine adapted for use in connection with the drilling of oil, gas, or like wells, and which is particularly designed and constructed so as to provide a unit assembly rotary machine that is of comparatively light structure and which rotary is also provided with a unit assembly pinion shaft providing an overhanging sprocket which may be attached to or disconnected from the rotary machine as a unit.

The principal object of this invention is to provide a rotary machine of simple, light and strong construction, which is assembled as a unit machine upon skids or the like, so that the same may easily be moved or transported from working position to working position and which is of such construction that the same may, if required, be easily taken apart to permit the making of repairs and which is also provided with a unitary assembly pinion shaft providing an overhanging sprocket.

Another object of this invention is to provide a rotary machine having a unitary pinion shaft assembly adapted to be connected with the rotary machine and which assembly includes a bearing housing enclosing bearings upon which the pinion shaft is journaled, and to which shaft there is secured an overhanging sprocket.

Another object of this invention is to provide a rotary machine having a unitary pinion shaft assembly adapted to be connected with the rotary machine, the assembly including a housing enclosing pinion shaft bearings upon which a pinion shaft is journaled, the pinion shaft being provided at one end with an overhanging sprocket having sprocket teeth formed in off center position and means for reversibly securing the sprocket to the pinion shaft to permit an adjustment of the sprocket teeth relative to the rotary machine drive mechanism (rotary drawworks, etc.) to align the overhanging sprocket with the rotary drive sprocket of the said drive mechanism.

Another object of this invention is to provide a rotary machine including a unitary pinion shaft, bearing and housing assembly including a housing adapted to be removably secured to the base of the rotary machine, the housing enclosing spaced bearings upon which a pinion shaft is journaled, the pinion shaft being provided at one end with a pinion gear and at its opposite end with an overhanging sprocket, the housing also enclosing end thrust bearings and means within the housing for compensating for wear on the end thrust bearings.

Another object of this invention is to provide a rotary machine having a unit assembly pinion shaft structure which is adapted to be detachably connected to the rotary machine in operative position and which also provides lock means interposed between the unitary pinion shaft assembly housing and the rotary machine for locking the shaft and rotary table driven by the shaft to the base.

Other objects and advantages of this invention, it is believed, will be apparent from the following detailed description of my invention, as illustrated in the accompanying drawings.

In the drawings:

Figure 1 is a perspective of a rotary machine embodying this invention.

Figure 2 is a central side sectional elevation thereof.

Figure 4 is an enlarged fragmental top plan view of the base of the rotary machine embodied in this invention.

Figure 5 is an end elevation of the base of the rotary machine illustrating the spaced ways provided for the reception of the housing of the unit assembly pinion shaft structure.

Figure 6 is an end elevation of the housing within which the unit assembly pinion shaft and bearings are mounted.

Figure 7 is a fragmental end view on a reduced scale illustrating a modified form of base and housing construction embodied in this invention.

Figure 8 is a fragmental side elevation of a modified form of unitary assembly pinion shaft structure illustrating the pinion shaft lock embodied in this invention.

Figure 3:
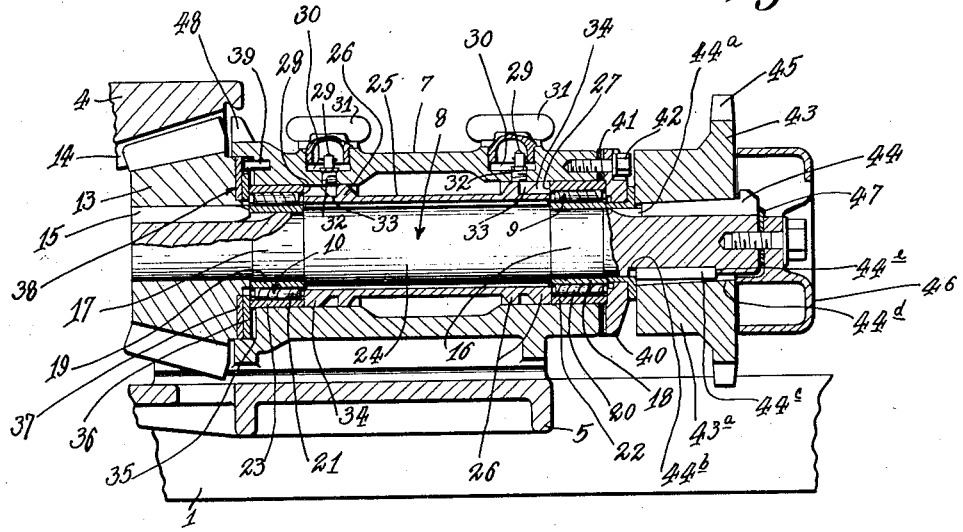
Figure 3 is an enlarged sectional side elevation of the unitary pinion shaft assembly embodying this invention.

In the preferred embodiment of this invention illustrated in the accompanying drawings, 1 illustrates a pair of spaced skids. Mounted on the skids 1 is a base 2. The base 2 may be of any suitable or desirable construction and is provided with a vertically extending passage 3 formed therethrough within which a rotatable table 4 is mounted.

The base 2 and the table 4 may be of any suitable or desirable construction, such as to permit the use of slips, bushings, etc., to provide a universal make and break rotary machine or may be of such construction as to be adapted for use only in connection with a straight rotary machine of the ordinary type.

The exact construction of the rotary machine illustrated in Figure 2 in order to provide a universal make and break rotary is particularly disclosed in the copending application of John D. Spalding, Serial No. 89,058, filed February 18, 1926, Patent No. 1,782,769 issued November 25, 1930.

The base 2 is preferably of one piece construction and provides an outwardly extending portion 5 which is constructed so as to provide a pair of spaced ways 6. Mounted on the outwardly extending portion 5 of the base 2 within the ways 6 is a housing 7 within which the pinion shaft 8 is rotatably supported on bearings 9 and 10. The housing 7 is provided with downwardly extending feet 11 which closely fit within ways 6 and through which bolts 12 are passed to secure the same in position to the base 2. The pinion shaft 8 is mounted within the housing 7 so that the center line of the pinion shaft if extended will intersect the vertical axis of the rotary table 4.

Secured to the inner end of the pinion shaft 8 is a pinion gear 13 which is mounted in position to mesh with the beveled teeth 14 of the rotary table 4. The pinion gear 13 is secured to the shaft 8 by any suitable means, such as by the key illustrated at 15.

Mounted upon the reduced portions 16 and 17 of the shaft 8 are bearing sleeves 18 and 19 upon which the bearing rollers 20 and 21 are journaled. Surrounding the bearing rollers 20 and 21 are sleeves 22 and 23. Mounted around and spaced from the enlarged portion 24 of the pinion shaft 8 within the housing 7 between the roller bearing assembles described is a sleeve 25 so as to be adjustable longitudinally relative to the shaft 8. The sleeve 25 is at its opposite ends provided with circumferential flanges 26 which closely fit the interior bore of the housing 7 and at their ends 27 and 28 engage the adjacent ends of the roller bearing assembles so that the roller bearing assemblies may be moved as a unit longitudinally of the shaft 8 with the bearing sleeve 25.

Means are provided for lubricating or greasing the roller bearing assemblies which preferably comprise grease or oil fittings 29 which are screw-threaded into position in the housing 7 within recesses 30 formed therein. Screw-threaded within the recesses 30 are caps 31 which cover the grease fittings 29. The grease fittings 29 communicate through bores 32 formed in the housing 7 with circumferentially extending grease recesses 33 formed in the circumferentially extending flanges 26 of the sleeve 25. Transversely extending grease ducts 34 are formed in the flanges 26 in communication with the bores 32 and recesses 33 and provide grease ducts through which the grease or oil passes to the roller bearing assemblies.

Mounted within the housing 7 at the inner end thereof within the thrust bearing recess 35 are thrust bearing washers 36 and 37. The thrust bearing washer 37 engages the face 38 of the pinion gear 13 and the thrust bearing washer 36 engages the roller bearing assembly provided by the bearing sleeves 19 and 23 and the bearing rollers 21. The thrust washer 37 is mounted in position so as to permit the same to float freely. The thrust bearing washer 36 is secured in position by means of a key 39, which is mounted within a recess formed in the end of the housing 7 and projects into a recess formed in the washer 36.

Secured at the opposite end of the housing 7 is a cap 40 which engages the outer end of the bearing assembly provided by the bearing sleeves 18 and 22 and bearing rollers 20. In order to permit the cap 40 to be adjusted to move the adjacent bearing assembly longitudinally of the shaft 8 and hence move the bearing sleeve 25 longitudinally of the shaft 8 to engage the bearing assembly provided at the opposite end of the sleeve 25 to take up the wear on the thrust washers 36 and 37, shims 41 are interposed between the adjacent faces of the cap 40 and end face of the housing 7. The cap 40 is secured in position by means of stud bolts 42 which are passed through the cap 40 and screw-threaded into the housing 7.

Secured to the outer end of the pinion shaft 8 is a sprocket 43 which is secured in position by means of a key 44 which fits within a keyway formed in the end of the shaft 8. The sprocket 43 may be reversed in position upon the end of the shaft 8 so as to change the position of the teeth 45 thereof in relation to the drive sprocket of the rotary drawworks, not shown, to align the two sprockets.

The sprocket 43 includes a hub 43$^a$ and sprocket teeth 45 formed on the hub 43$^a$. The sprocket teeth 45 are formed on the hub 43$^a$ in off center position, or in position near one end of the hub 43$^a$ so that when the sprocket 43 is reversed end for end on the pinion shaft 8, the position of the teeth 45 is changed relative to the rotary drive sprocket of the rotary drawworks or like rotary drive sprocket (not shown).

In order to permit the sprocket 43 to be changed end for end on the shaft 8 and hence adjust the position of the teeth 45, the shaft 8 is provided with a key-way 44$^a$ into which the key 44 may be inserted from either end of the hub 43$^a$. The shaft 8 is also provided with a second parallel key-way 44$^b$ into which a key 44$^c$ is fitted. The key 44$^c$ also fits into a key-way 44$^d$, which extends longitudinally through the hub 43$^a$. The key 44$^c$ engages at one end a shoulder 44$^e$ formed at the end of the key-way 44$^b$. As is obvious from Figure 3, the hub 43$^a$ of the sprocket 43 is provided with two oppositely tapered keyways diametrically located in the sprocket 4. The oppositely tapered keyways permit the tapered key 44 to be assembled from either face of the sprocket that happens to be toward the end of the pinion shaft 8.

Secured to the end of the shaft 8 is a cap 46 which incloses the end of the shaft 8 and the key 44 and provides means for holding a lock washer 47 in position to prevent displacement of the key 44.

The end of the housing 7 is formed to provide a guard 48 which encloses the pinion gear 13 and fits closely to the base 2 and table 4 of the rotary machine to prevent introduction of foreign matter into the unit pinion shaft assembly.

In the modified form of this invention illustrated in Figure 7, the outward extension 5$a$ of the base 2$a$ is formed with upwardly projecting longitudinally extending bars 6$a$ which fit within complementary longitudinally extending grooves or ways 11$a$ formed in the laterally extending projections 49$a$ of the housing 7$a$.

Figure 9:
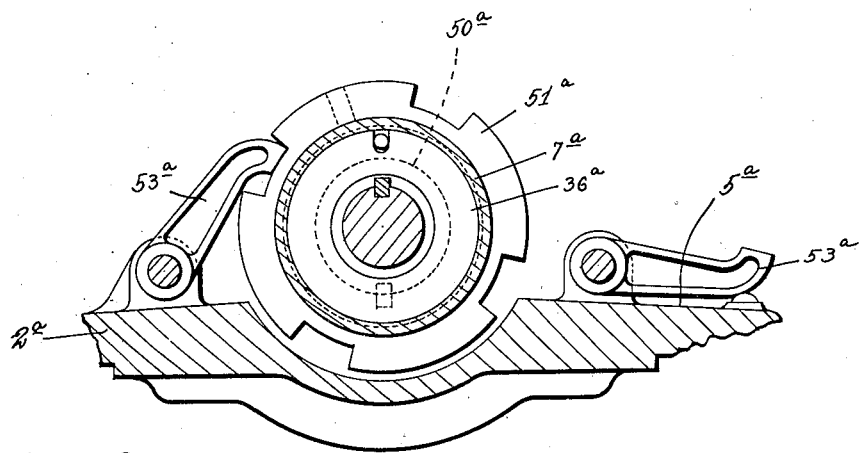
Figure 9 is a sectional end elevation of the modified form of unitary pinion shaft assembly shown in Figure 8.

In the modified form of unit assembly pinion shaft structure illustrated in Figures 8 and 9, the pinion gear 13$a$ is provided with a cylindrical extension 50$a$, upon which a lock ring 51$a$ is mounted and secured by any suitable or desirable means, such as a key, or the like. The lock ring 51$a$ is formed in such a manner that the portion 52$a$ thereof extends over the inner adjacent end of the housing 7$a$ so as to provide a guard to prevent foreign matter being introduced into the interior of the unit assembly pinion shaft structure. Formed around the periphery of the lock ring 51$a$ are a plurality of recesses into any one of which the end of a lock bar 53$a$ is adapted to be inserted. The lock bar 53$a$ is pivotally supported in any suitable or desirable manner on the extension 5$a$ of the base 2$a$. In this modified form of structure, the thrust washers 36$a$ and 37$a$ engage the outer surface of the lock ring 51$a$ rather than the outer surface of the pinion gear 13$a$.

Having fully described my invention, it is to be understood that I do not wish to be limited to the details herein set forth, which may obviously be varied without departing from the spirit of my invention as defined by the appended claims.

I claim:

1. In a rotary machine, the combination of a base, a table rotatably supported by the base, a housing removably secured to the base in ways formed therein, bearings mounted in the housing in spaced relation, a bearing sleeve mounted between the bearings, a pinion shaft journaled in the housing on the bearings, a pinion gear secured to the pinion shaft and adapted to mesh with gear teeth formed on the rotary table, and an overhanging sprocket secured to the opposite end of the shaft beyond the end of the housing.

2. In a rotary machine, the combination of a base, a rotary table supported by the base, a housing, means for removably securing the housing to the base, spaced bearings mounted within the housing at the opposite ends thereof, a bearing sleeve mounted in the housing intermediate the bearings and adapted to engage the bearings at their adjacent ends, a pinion shaft rotatably supported in said bearings, means for adjusting the bearings longitudinally of the shaft, a pinion gear secured to the pinion shaft and adapted to mesh with gear teeth formed on the rotary table, thrust bearing members interposed between the face of the pinion gear and the end face of the housing in position to engage the inner adjacent end bearing; and an overhanging sprocket secured to the opposite end of the shaft beyond the end of the housing.

3. In a rotary machine including a base and a table rotatably supported by the base the combination of a housing removably secured to the base, bearings mounted within the housing in spaced relation, a bearing sleeve mounted intermediate the bearings, a pinion shaft journaled in the housing on the bearings, a pinion gear secured to one end of the shaft and adapted to mesh with gear teeth formed on the table, and an overhanging sprocket secured to the opposite end of the shaft beyond the end of the housing.

4. In a rotary machine including a base providing a vertical bore and a table journaled on the base in the bore, of a unitary pinion shaft assembly, means for securing the pinion shaft assembly to the base so that the longitudinal axis of the pinion shaft projected will intersect the vertical axis of the table, the unitary pinion shaft assembly including bearings mounted within the housing, a pinion shaft journaled on the bearings, a bearing sleeve intermediate the bearings, flanges formed at the end of the bearing sleeve to engage the adjacent ends of the bearings, lubricating means and lubricant ports formed through the flanges and communicating with the lubricating means at one end and with the bearings at their opposite ends.

5. In a rotary well drilling machine, the combination of a base, a rotary table mounted on the base, a unit assembly pinion shaft, a pinion gear carried by the shaft and adapted to drive the rotary table, a pinion housing secured to the base, roller bearings mounted in said housing and supporting the said shaft, a drive sprocket removably secured to the said shaft, a thrust bearing washer interposed between the face of the pinion gear and the end face of the said housing, and means for taking up the wear on said thrust washer.

6. In a rotary well drilling machine, the combination of a table base, a rotary table mounted on the base, a unit assembly pinion shaft, a pinion gear carried by the shaft and adapted to drive the rotary table, a pinion shaft housing secured to the said base, roller bearings mounted in the housing and supporting the said shaft, a bearing sleeve interposed between and adapted to maintain the said bearings spaced, a thrust bearing interposed between the face of the pinion gear and the end face of the said housing, and means secured in position at the opposite end of the housing for moving the roller bearings and bearing sleeve assembly to take up wear on the said thrust bearing.

7. In a rotary well drilling machine, the combination of a table base, a rotary table mounted on the base, a unit pinion shaft assembly, including a shaft, a pinion gear carried by the shaft and adapted to drive the rotary table, a pinion shaft housing secured to the table base, roller bearings mounted in the housing and supporting the shaft, means interposed between and adapted to maintain the bearings spaced, a thrust bearing member interposed between the face of the pinion gear and the end face of the housing, means for moving the roller bearing, means including a member interposed between the roller bearings to take up wear on the thrust bearing member, and an overhanging sprocket removably secured to the shaft exterior of the housing.

8. In a rotary machine, the combination of, a base, a rotary table supported by the base, a housing, means for removably securing the housing to the base, spaced bearings mounted within the housing at the opposite ends thereof, a bearing sleeve mounted in the housing intermediate the bearings and adapted to engage the bearings at their adjacent ends, a pinion shaft supported by the bearings, a pinion gear secured to the pinion shaft and adapted to mesh with gear teeth formed on the rotary table, thrust bearing members interposed between the face of the pinion gear and the end face of the housing in position to engage the inner adjacent end bearing, and an overhanging sprocket secured to the opposite end of the shaft beyond the end of the housing.

9. In a rotary machine, the combination of a base, a table rotatably supported by said base, a unitary housing secured to said base, a pair of bearings, the bearings being supported in said unitary housing near each end thereof and said bearings relatively spaced, said unitary housing holding said bearings in true axial alignment, a pinion shaft carried by said bearings, a pinion on one end of said pinion shaft for driving said table, and drive means on the other end of said pinion shaft.

10. In a rotary machine, the combination of a base, a table rotatably supported by said base, a unitary housing secured to said base, aligning means cooperating between said base and said unitary housing for maintaining said unitary housing in aligned position on said base, a pair of bearings, the bearings being supported in said unitary housing near each end thereof and said bearings relatively spaced, said unitary housing holding said bearings in true axial alignment, a pinion shaft carried by said bearings, a pinion on one end of said pinion shaft for driving said table, and drive means on the other end of said pinion shaft.

11. In a rotary machine, the combination of a base, a table rotatably supported by said base, a unitary housing secured to said base, shoulders cooperating between said base and said unitary housing for maintaining said unitary housing in aligned position on said base, a pair of bearings, the bearings being supported in said unitary housing near each end thereof and said bearings relatively spaced, said unitary housing holding said bearings in true axial alignment, a pinion shaft carried by said bearings, a pinion on one end of said pinion shaft for driving said table, and drive means on the other end of said pinion shaft.

12. In a rotary machine, the combination of a base, a table rotatable on said base, a unitary housing adapted to be secured to said base, a pair of relatively spaced bearings carried by said unitary housing near the ends thereof, said bearings being rigidly retained in such relative positions as to be on the same axis, and aligning means cooperating between said base and said unitary housing for maintaining said unitary housing in such a position that the axis of said bearings will intersect the axis on which said table rotates.

13. In a rotary machine, the combination of a base, a table rotatable on said base, a unitary housing adapted to be secured to said base, a pair of relatively spaced bearings carried by said unitary housing near the ends thereof, said bearings being rigidly retained in such relative positions as to be on the same axis, and rigid shoulders cooperating between said base and said unitary housing for maintaining said unitary housing in such a position that the axis of said bearings will intersect the axis on which said table rotates.

14. In a rotary well drilling apparatus, the combination of a base, a rotary table vertically journaled on said base, a horizontally disposed self contained pinion shaft unit aligned radially with the axis of said table, said unit comprising a unitary bearing support engaging in opposed parallel ways in said base and having two relatively spaced bearings supported therein on a common axis, a pinion shaft journaled in said bearings, and a pinion secured on the inner end of said shaft and in driving connection with said table, and means for detachably securing said unit in position in said ways.

15. In a rotary well drilling apparatus, the combination of a base, a rotary table vertically journaled on said base, a horizontally disposed self-contained pinion shaft unit aligned radially with the axis of said table, said unit comprising a unitary bearing support engaging in opposed parallel ways in said base and having two relatively spaced bearings supported therein on a common axis, a pinion shaft journaled in said bearings, and a pinion secured on the inner end of said shaft and in driving connection with said table, means for detachably securing said unit in position in said ways, and means for locking the pinion shaft against rotation.

16. In a rotary well drilling apparatus, the combination of a base, a rotary table vertically journaled on said base, a horizontally disposed self contained pinion shaft unit aligned radially with the axis of said table, said unit comprising a unitary bearing support engaging in opposed parallel ways in said base and having two relatively spaced bearings supported therein on a common axis, a pinion shaft journaled on said bearings, and a pinion secured on the inner end of said shaft and in driving connection with said table, means for detachably securing said unit in position in said ways, and a driving means supported on the outer free end of said shaft.

17. In a rotary machine, the combination of a base, a rotary table supported by the base, a housing, means for removably securing the housing to the base, a pinion shaft assembly including a pinion shaft, spaced bearings in which the shaft is journaled, said bearings being mounted within the housing at the opposite ends thereof, a bearing sleeve mounted in the housing intermediate the bearings and adapted to engage the bearings at their opposite ends, means for adjusting the bearings longitudinally of the shaft, and a pinion gear secured to the pinion shaft and adapted to mesh with gear teeth formed on the rotary table, thrust bearing members interposed between a thrust face formed in the pinion gear end of the pinion shaft assembly and the end face of the housing in position to engage the inner adjacent end bearing, an overhanging sprocket secured to the opposite end of the shaft beyond the end of the housing, and lock means mounted between the pinion gear and the housing and including a ring, means for securing the ring to the pinion shaft assembly, and means secured to the base and adapted to be engaged with the ring to hold the shaft from rotation relative to the base.

18. In a rotary machine, the combination of a base providing a vertical bore, a table rotatably mounted on the base in the bore, the base providing an outwardly extending portion, a housing, bearings mounted entirely within the housing, a pinion shaft journaled on the bearings, means for removably securing the entire housing to the outwardly extending portion of the base so that the bearings and shaft are removable with the housing as a unit from the base, a pinion gear secured to the shaft at one end to mesh with gear teeth formed on the table, and an overhanging sprocket secured to the opposite end of the pinion shaft.

Signed at Torrance, Calif., this 13th day of April, 1927.

DAVID S. FAULKNER.

DISCLAIMER 1,875,430.—*David S. Faulkner*, Los Angeles, Calif. ROTARY MACHINE. Patent dated September 6, 1932. Disclaimer filed March 23, 1934, by the assignees, *The National Supply Company* and *Emsco Derrick & Equipment Company*.

Hereby enters this disclaimer to that part of the claims in said specification which is in the following words, to wit:

"9. In a rotary machine, the combination of a base, a table rotatably supported by said base, a unitary housing secured to said base, a pair of bearings, the bearings being supported in said unitary housing near each end thereof and said bearings relatively spaced, said unitary housing holding said bearings in true axial alignment, a pinion shaft carried by said bearings, a pinion on one end of said pinion shaft for driving said table, and drive means on the other end of said pinion shaft.

"10. In a rotary machine, the combination of a base, a table rotatably supported by said base, a unitary housing secured to said base, aligning means cooperating between said base and said unitary housing for maintaining said unitary housing in aligned position on said base, a pair of bearings, the bearings being supported in said unitary housing near each end thereof and said bearings relatively spaced, said unitary housing holding said bearings in true axial alignment, a pinion shaft carried by said bearings, a pinion on one end of said pinion shaft for driving said table, and drive means on the other end of said pinion shaft.

"11. In a rotary machine, the combination of a base, a table rotatably supported by said base, a unitary housing secured to said base, shoulders cooperating between said base and said unitary housing for maintaining said unitary housing in aligned position on said base, a pair of bearings, the bearings being supported in said unitary housing near each end thereof and said bearings relatively spaced, said unitary housing holding said bearings in true axial alignment, a pinion shaft carried by said bearings, a pinion on one end of said pinion shaft for driving said table, and drive means on the other end of said pinion shaft.

"12. In a rotary machine, the combination of a base, a table rotatable on said base, a unitary housing adapted to be secured to said base, a pair of relatively spaced bearings carried by said unitary housing near the ends thereof, said bearings being rigidly retained in such relative positions as to be on the same axis, and aligning means cooperating between said base and said unitary housing for maintaining said unitary housing in such a position that the axis of said bearings will intersect the axis on which said table rotates.

"13. In a rotary machine, the combination of a base, a table rotatable on said base, a unitary housing adapted to be secured to said base, a pair of relatively spaced bearings carried by said unitary housing near the ends thereof, said bearings being rigidly retained in such relative positions as to be on the same axis, and rigid shoulders cooperating between said base and said unitary housing for maintaining said unitary housing in such a position that the axis of said bearings will intersect the axis on which said table rotates.

"14. In a rotary well drilling apparatus, the combination of a base, a rotary table vertically journaled on said base, a horizontally disposed self contained pinion shaft unit aligned radially with the axis of said table, said unit comprising a unitary bearing support engaging in opposed parallel ways in said base and having two relatively spaced bearings supported therein on a common axis, a pinion shaft journaled in said bearings, and a pinion secured on the inner end of said shaft and in driving connection with said table, and means for detachably securing said unit in position in said ways.

"15. In a rotary well drilling apparatus, the combination of a base, a rotary table vertically journaled on said base, a horizontally disposed self-contained pinion shaft unit aligned radially with the axis of said table, said unit comprising a unitary bearing support engaging in opposed parallel ways in said base and having two relatively spaced bearings supported therein on a common axis, a pinion shaft journaled in said bearings, and a pinion secured on the inner end of said shaft and in driving connection with said table, means for detachably securing said unit in position in said ways, and means for locking the pinion shaft against rotation.

"16. In a rotary well drilling apparatus, the combination of a base, a rotary table vertically journaled on said base, a horizontally disposed self contained pinion shaft unit aligned radially with the axis of said table, said unit comprising a unitary bearing support engaging in opposed parallel ways in said base and having two relatively spaced bearings supported therein on a common axis, a pinion shaft journaled on said bearings, and a pinion secured on the inner end of said shaft and in driving connection with said table, means for detachably securing said unit in position in said ways, and a driving means supported on the outer free end of said shaft."

"18. In a rotary machine, the combination of a base providing a vertical bore, a table rotatably mounted on the base in the bore, the base providing an outwardly extending portion, a housing, bearings mounted entirely within the housing, a pinion shaft journaled on the bearings, means for removably securing the entire housing to the outwardly extending portion of the base so that the bearings and shaft are removable with the housing as a unit from the base, a pinion gear secured to the shaft at one end to mesh with gear teeth formed on the table, and an overhanging sprocket secured to the opposite end of the pinion shaft."

[*Official Gazette April 10, 1934.*]